H. SCHMICK.
ART OF DRIVING GAS OR GAS AND STEAM TURBINES.
APPLICATION FILED MAY 21, 1906.

910,237.

Patented Jan. 19, 1909.

Witnesses:
M. Taylor.
N. Reynolds.

Inventor:
Heinrich Schmick,
by George Massie
Attorney

UNITED STATES PATENT OFFICE.

HEINRICH SCHMICK, OF ESSEN-ON-THE-RUHR, GERMANY.

ART OF DRIVING GAS OR GAS-AND-STEAM TURBINES.

No. 910,237.

Specification of Letters Patent.

Patented Jan. 19, 1909.

Application filed May 21, 1906. Serial No. 317,963.

*To all whom it may concern:*

Be it known that I, HEINRICH SCHMICK, engineer, a subject of the German Emperor, residing at Essen-on-the-Ruhr, 62 Heinickenstrasse, Germany, have invented certain new and useful Improvements in Art of Driving Gas or Gas-and-Steam Turbines; and I do hereby declare the following to be a full, clear, and exact description of the invention, such as will enable others skilled in the art to which it appertains to make and use the same.

It is old in heat engines acting in several steps of pressure, as for instance in compound steam engines, gas turbines, steam turbines and so on, to introduce heat to the fluid between the single steps by means of heating surfaces but without changing the amount of the fluid, *e. g.* by heating the receiver of a steam engine or by reheating the dead fluid of the first turbine by a superheater.

According to my invention the intermediate superheating of the fluid in heat engines with several steps of pressure is accomplished by introducing highly heated gases of combustion into the fluid or by the combustion of a mixture of air and fuel within the fluid, that is, by internal heating, wherein the heating medium coöperates in the process. Therefore the amount of the working fluid does not remain constant but increases step by step according to the fluid added between the steps.

This new method has, over the known methods of heating the fluid by means of surfaces, the advantage that the introduction of heat can be effected in a smaller space and with a much higher final temperature. Over step turbines in which the whole mixture of air and fuel is burned and introduced before the first step there is the further advantage that only a part of the mixture is needed to be compressed to the highest pressure while the rest is only brought to the pressure of the single steps. This insures a great saving of work.

My new method enables one to use a stepwise compression with great advantage by taking the heating medium from the single steps of a step by step compressor.

My invention is shown by way of example in the accompanying drawing in which—

Figure 1:
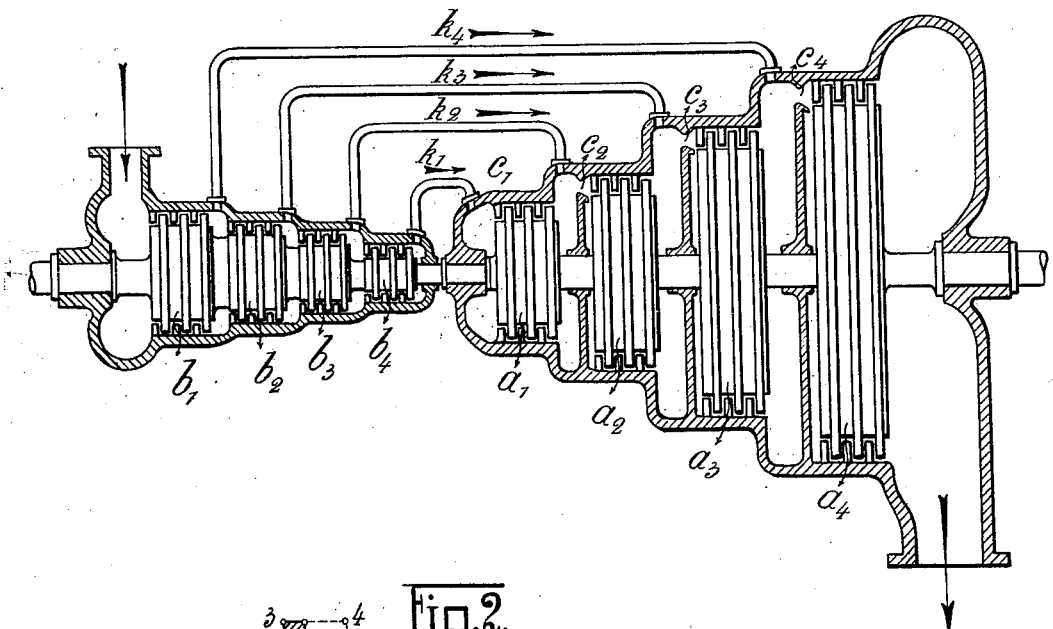
Figure 2:
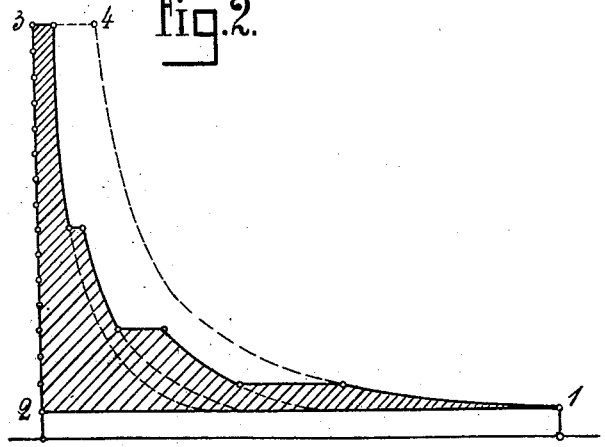

Figure 1 is a diagrammatic view of a four step turbine. Fig. 2 is a diagram showing the work of the compression.

$a^1$, $a^2$, $a^3$ and $a^4$ are four steps of a turbine, $b^1$, $b^2$, $b^3$ and $b^4$ are the steps of a rotary compressor and $c^1$, $c^2$, $c^3$ and $c^4$ are the burning or expansion nozzles arranged before the single steps respectively. As it will be seen, in the present example the first step of the turbine is fed from the last step of the compressor. The second step of the turbine receives the exhaust from the first step of the turbine and the fuel coming from the third step of the compressor; the third step of the turbine receives the exhaust of the second step and the fuel coming from the second step of the compressor.

If we designate by $k_1$, $k_2$, $k_3$ etc. the weight of motive fluid in kilograms added to the first, second, third and further steps, respectively, of the expansion turbine, the operation is as follows:

1. The step $a^1$ of the turbine is fed with $k_1$ kg. fluid from the last step $b^4$ of the compressor. This $k_1$ kg. fluid contain $\alpha_1$ calories and are burned within the nozzle $c^1$ at the highest admissible temperature $T_1$ and then expanded to a temperature $T_2$ whereby $\beta_1$ calories are changed into kinetical energy. Therefore the exhaust of the step $a^1$ of the turbine contains $k_1$ kg. with $\alpha_1 - \beta_1 = \gamma_1$ calories.

2. The nozzle $c^2$ of the second step $a^2$ receives the exhaust of the first step with $\gamma_1$ cal. and $k_2$ kg. new fuel with $\alpha_2$ cal. Then the mixture is burned and $\beta_2$ cal. are changed into kinetical energy between the temperatures $T_1 = T_2$. The exhaust of the second step of the turbine contains still $\alpha_1 + \alpha_2 - \beta_1 - \beta_2 = \gamma_2$ calories.

3. In the same manner the exhaust of $a^3$ consists of $(k_1 + k_2 + k_3)$ kg. with $(\alpha_1 + \alpha_2 + \alpha_3 - \beta_1 - \beta_3)$ cal.

4. The exhaust of $a^4$ consists of $(k_1 + k_2 + k_3 + k_4)$ kg. with $(\alpha_1 + \alpha_2 + \alpha_3 + \alpha_4 - \beta_1 - \beta_2 - \beta_3 - \beta_4)$ cal.

In the diagram of pressure and volume as shown in Fig. 2 the surface 1, 2, 3, 4 represents the work of compression, which would be necessary for compressing the whole fuel to the highest pressure in the first step. The work of compression necessary in the present invention is shown by a hatched surface.

In applying the method to gas-and-steam turbines the introduction of the burning gases is of course effected at first behind the first step. Each of the steps or groups of pressure of the turbine may consist of any number of velocity steps.

Obviously it is not essential for my present invention whether the new fluid introduced for the intermediate heating is burned completely within the exhaust of the preceding step or partly or completely in an isolated chamber before being mixed with the exhaust.

It will be seen from the above description that under this invention the fluid employed to drive the fluid expansion engine is introduced into each cylinder $a_1$, $a_2$, $a_3$, $a_4$ of such expansion engine, and, moreover, that the degree of compression of the fluid so introduced varies for each step in such a way that the density or pressure of the fluid passing into the successive cylinders from the highest pressure cylinder down to the lowest pressure cylinder, decreases with the pressure in said cylinders. In other words, the additional fluid introduced into each cylinder is that having a density which is nearest to the density of the fluid in said cylinder and coming from the cylinder preceding. The compression cylinders of the stepped compressor are for this purpose arranged with the conduits $k_1$, $k_2$, $k_3$, $k_4$ in such a manner that the compressor chamber or cylinder in which the highest degree of compression and the highest density of the driving fluid exist is brought into communication with that expansion chamber or cylinder of the expansion engine where the lowest degree of expansion occurs, the compression chamber or cylinder in which the next highest degree of compression exists with that expansion cylinder in which the next lowest degree of expansion takes place, and so on to the last compression chamber and the last expansion chamber. This is equivalent to saying that the expansion chambers and compression chambers are so connected in pairs in such a way that in each case that expansion chamber and that compression chamber in which the degrees of compression or density of the contained fluid are the nearest are in communication. Such combination of a stepped-off fluid compressor with a stepped-off fluid expanding engine has the merit of requiring only a fraction of the work required for compression of the entire volume of fluid employed to the highest degree, as is made evident by the work diagram of Fig. 2 in which the abscissæ represent the fluid volume and the ordinates the fluid pressure. Such economy of work ensues in the case of a gas-and-steam turbine as well as in that of gas turbines, in which former case the superheating of the steam takes place at a considerable decrease of pressure under this construction. It is to be added that since under this construction the differences between the pressures of the fluids in the compressing chambers and those in the expanding chambers are reduced very materially, a waste of energy due to loss of heat and other similar losses is avoided.

Having now particularly described and ascertained the nature of my said invention and in what manner the same is to be performed, I declare, that what I claim is:

1. The process of driving gas-and-steam or gas turbines, which consists in compressing the driving fluid in steps and causing the fluid of each step of the compression to expand separately in steps and in the inverse order of compression, the compressed fluid of each step mingling with the expanded fluid coming from the preceding step of expansion.

2. The process of driving gas-and-steam or gas turbines, which consists in causing a compressed driving fluid to expand in a series of steps and adding to the fluid at each step of expansion additional compressed fluid, the degree of compression of such additional fluid being inverse to the degree of expansion of the expanding fluid.

3. The method of driving gas-and-steam or gas turbines, which consists in causing a compressed driving fluid to expand in a series of steps and adding to the fluid after each step of expansion heated compressed fluid, the degree of compression of the fluid added to the successive steps of expansion decreasing as the degree of expansion of the fluid of such steps increases.

4. The combination, of a stepped fluid expansion engine with a stepped fluid compressor, and means for introducing the compressed fluid from each cylinder of the compressor into the expansion cylinder containing the fluid nearest in density to the fluid in such compression cylinder.

5. The combination, of a stepped fluid expansion engine and a stepped fluid compressor having a series of compression cylinders with a series of conduits arranged to connect each of the cylinders of the expansion engine with that compression cylinder containing fluid nearest in density to its driving fluid.

6. A stepped fluid expansion engine having cylinders arranged in series from the highest to the lowest pressure, in combination, with conduits, one for each cylinder, and compression chambers communicating with said conduits and so arranged that the compression chambers and cylinders containing the fluid nearest in density are in communication.

In testimony whereof I have hereunto affixed my signature in the presence of two witnesses.

HEINRICH SCHMICK.

Witnesses:
WILLIAM ESSENWEIN,
ALFR. POHLMEYER.